United States Patent
Negulescu

(10) Patent No.: US 8,720,208 B2
(45) Date of Patent: May 13, 2014

(54) AIRCRAFT GAS TURBINE ENGINE

(75) Inventor: Dimitrie Negulescu, Berlin (DE)

(73) Assignee: Rolls-Royce Deutschland Ltd & Co KG (DE)

( * ) Notice: Subject to any disclaimer, the term of this patent is extended or adjusted under 35 U.S.C. 154(b) by 721 days.

(21) Appl. No.: 13/024,438

(22) Filed: Feb. 10, 2011

(65) Prior Publication Data

US 2011/0209458 A1  Sep. 1, 2011

(30) Foreign Application Priority Data

Feb. 26, 2010 (DE) .......................... 10 2010 009 477

(51) Int. Cl.
  *F02C 3/04* (2006.01)
  *F02K 3/02* (2006.01)
  *F02C 1/06* (2006.01)

(52) U.S. Cl.
  USPC ............................ 60/805; 60/226.1; 60/39.17

(58) Field of Classification Search
  USPC .............. 60/39.17, 805, 806, 782, 785, 226.1
  See application file for complete search history.

(56) References Cited

U.S. PATENT DOCUMENTS

| | | | |
|---|---|---|---|
| 3,348,379 A | 10/1967 | Wilde | |
| 3,600,890 A * | 8/1971 | White et al. | 60/736 |
| 4,050,306 A | 9/1977 | Khalid | |
| 4,222,235 A | 9/1980 | Adamson et al. | |
| 4,446,696 A | 5/1984 | Sargisson et al. | |
| 4,569,199 A * | 2/1986 | Klees et al. | 60/226.1 |
| 5,056,307 A * | 10/1991 | Liang | 60/226.1 |
| 5,440,875 A | 8/1995 | Torkelson et al. | |
| 6,625,989 B2 * | 9/2003 | Boeck | 60/782 |
| 7,007,488 B2 * | 3/2006 | Orlando et al. | 60/782 |
| 7,040,097 B2 * | 5/2006 | Mukherjee | 60/775 |
| 7,134,271 B2 | 11/2006 | Baughman et al. | |
| 7,216,475 B2 | 5/2007 | Johnson | |
| 2003/0140615 A1 * | 7/2003 | Le Docte et al. | 60/226.1 |
| 2007/0089422 A1 * | 4/2007 | Widenhoefer et al. | 60/772 |
| 2009/0211222 A1 * | 8/2009 | Roberge | 60/226.1 |

FOREIGN PATENT DOCUMENTS

| | | |
|---|---|---|
| DE | 2653336 | 9/1977 |
| DE | 2831802 | 2/1979 |
| DE | 3600852 | 7/1986 |
| DE | 69406370 | 3/1998 |
| GB | 1330904 | 9/1973 |
| GB | 2169968 | 7/1986 |

OTHER PUBLICATIONS

German Search Report dated Jan. 18, 2011 from corresponding German application.

* cited by examiner

*Primary Examiner* — Gerald L Sung

(74) *Attorney, Agent, or Firm* — Timothy J. Klima; Shuttleworth & Ingersoll, PLC

(57) ABSTRACT

An aircraft gas turbine engine includes a core engine 1 having a high pressure turbine 6 and a downstream low pressure turbine 7. A bypass duct 18 surrounds the core engine 1. A mixer 19 is arranged in an inlet portion of the low pressure turbine 7, into which a bypass flow 20 from the bypass duct 18 and a core flow 22 from the core engine 1 are supplied.

7 Claims, 3 Drawing Sheets

AIRCRAFT GAS TURBINE ENGINE

Figure 1:
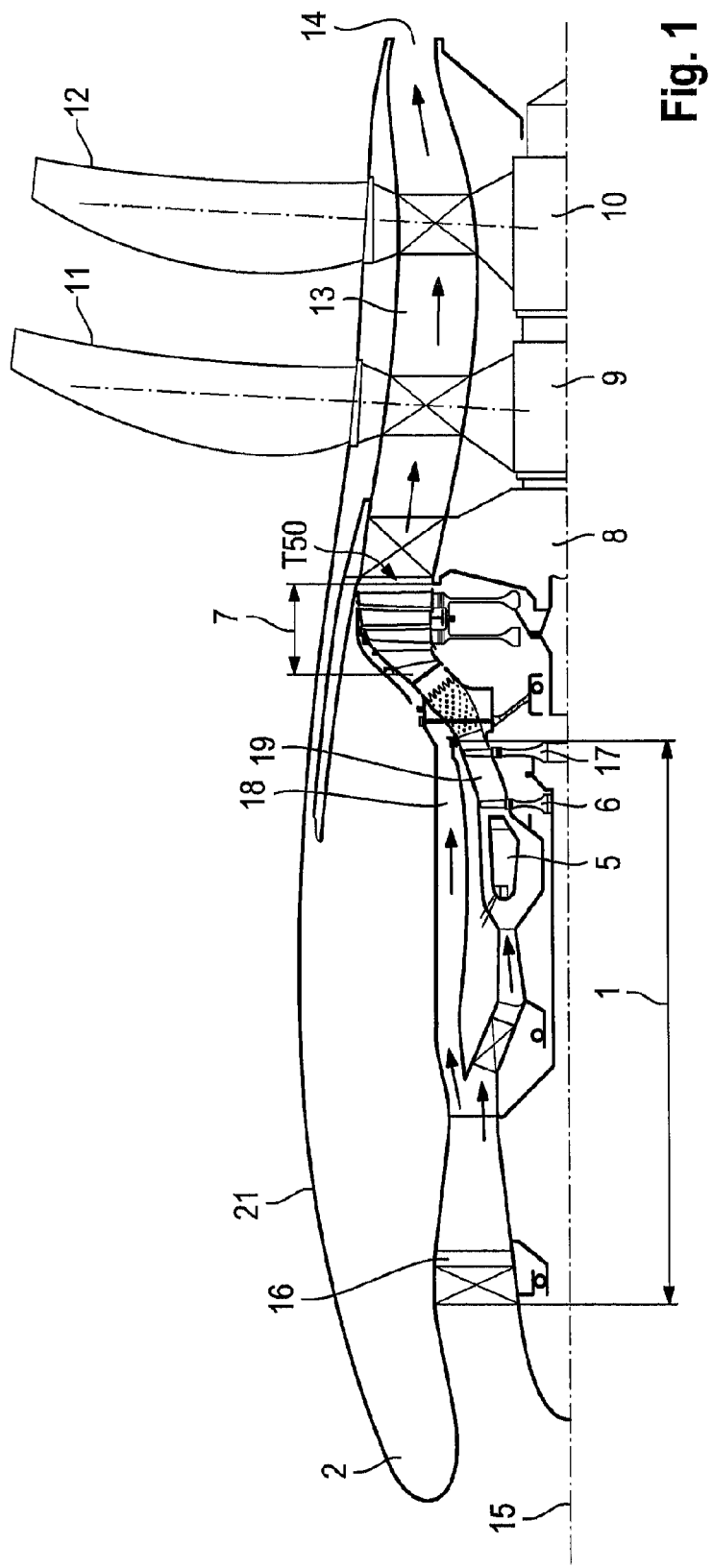

The invention relates to an aircraft gas turbine engine and can, in particular, be used for aircraft gas turbine engines including pressure propellers.

The state of the art describes propeller turbo jet engines in which a core engine is used in the usual manner for driving the power turbine. It usually comprises a low pressure impeller, a high pressure impeller, a combustion chamber, a high pressure turbine as well as a low pressure turbine as well as possibly a propeller and is e.g. formed as a double-shaft core engine. It is obvious that the individual impeller and turbine regions can be of the multi-stage type.

The gas flow entering the low pressure turbine has a high temperature level. This results in drawbacks with respect to the materials of components which are exposed to said gas flow. The use of temperature-resistant materials as well as the cooling of the components of the low pressure turbine require high efforts in view of production technology. In addition, specific measures for cooling further components in the flow channel toward the nozzle are required.

In particular when using such a gas turbine engine in combination with at least one pressure propeller, the high temperature level poses further problems, since additional measures for cooling are required, e.g. for cooling a transmission or a system for adjusting the propeller blades.

It is an object underlying the invention to provide an aircraft gas turbine engine of the aforementioned type, which avoids the drawbacks of the state of the art and, in particular, enables a lower temperature level in the region of the low pressure turbine, while having a simple structure and being manufactured simply and at low costs.

According to the invention, this object is solved by the combination of features described herein. The present description also discloses disclose further advantageous embodiments of the invention.

According to the invention, it is thus provided that the aircraft gas turbine engine comprises a core engine which is equipped with at least one high pressure turbine and one low pressure turbine. Further, the inventive aircraft gas turbine engine comprise a bypass duct surrounding the core engine. According to the invention, it is provided that the bypass flow is supplied through the bypass duct and the core flow is supplied through the core engine, respectively, to a mixer in an inlet portion of the low pressure turbine, in which the two flows are mixed, in order to obtain a lower temperature level at the inflow into the lower pressure turbine in this way.

According to the invention, additional measures for cooling the aforementioned components arranged in the hot gas flow of the exhaust gas portion of the low pressure turbine can be omitted, or a less cooling effort is required, e.g. for cooling the transmission of the pressure propeller or the system for adjusting the propeller blades.

According to the invention, a shaft power engine (turbo shaft engine), e.g. a double-shaft core engine, is thus generated, which can be equipped with at least one pressure propeller or two pressure propellers acting in opposite directions.

According to the invention, the bypass flow of the core engine in mixed with hot gases of the core engine (primary flow from the medium pressure turbine) by the mixer (flow mixing device) before entering the low pressure turbine. This results in a considerable reduction of the temperature level.

According to the invention, the mixer consists of a housing which is configured to be passed through by the core flow. The walls of the housing comprise recesses for introducing the bypass flow. In addition, the mixer preferably comprises a grid including flow profiles (guide plates), which grid is preferably attached at the side walls of the housing. For an enhanced mixing of the flows, it is further preferable to provide flower-shaped trailing edges (flower mixer).

Due to the lower temperatures occurring in the mixer, it is possible to arrange structural components for a bearing support of the low pressure turbine in the interior of the mixer.

Accordingly, the cold bypass flow is reliably and constantly mixed with the hot primary flow or core flow within the mixer according to the invention. For this purpose, the perforations of the side walls, gaps of the flower-shaped trailing edges as well as the recesses (perforations) at the outer and inner walls of the mixer ring channel are provided. As mentioned, the mixer can preferably be formed as a ring channel such that there results a constant temperature level about the periphery. With an appropriate arrangement and dimensioning of the recesses in the walls of the housing, it is possible to realize a favourable radial temperature distribution of the flow through the low pressure turbine and through the flow channel toward the nozzle.

A further essential advantage of the inventive solution results from the fact that an increased mass throughput through the low pressure turbine is obtained due to the mixing of the core flow with the bypass flow, such that the low pressure turbine can be equipped with a smaller number of stages. According to the invention, it is e.g. possible to provide only two stages in the low pressure turbine. The gas mixture expands when passing through the operating stages of the low pressure turbine and thus operates the transmission (differential gear) which drives the pressure propeller(s). Upon release through the low pressure turbine, the gas is completely expanded through a convergent nozzle by an annular flow channel and therewith contributes to a considerable portion of residual thrust.

According to the invention, there results a considerable reduction of weight and costs. In addition, the reliability of the propeller turbo jet engine as well as the service life of the individual components are increased.

Figure 2:
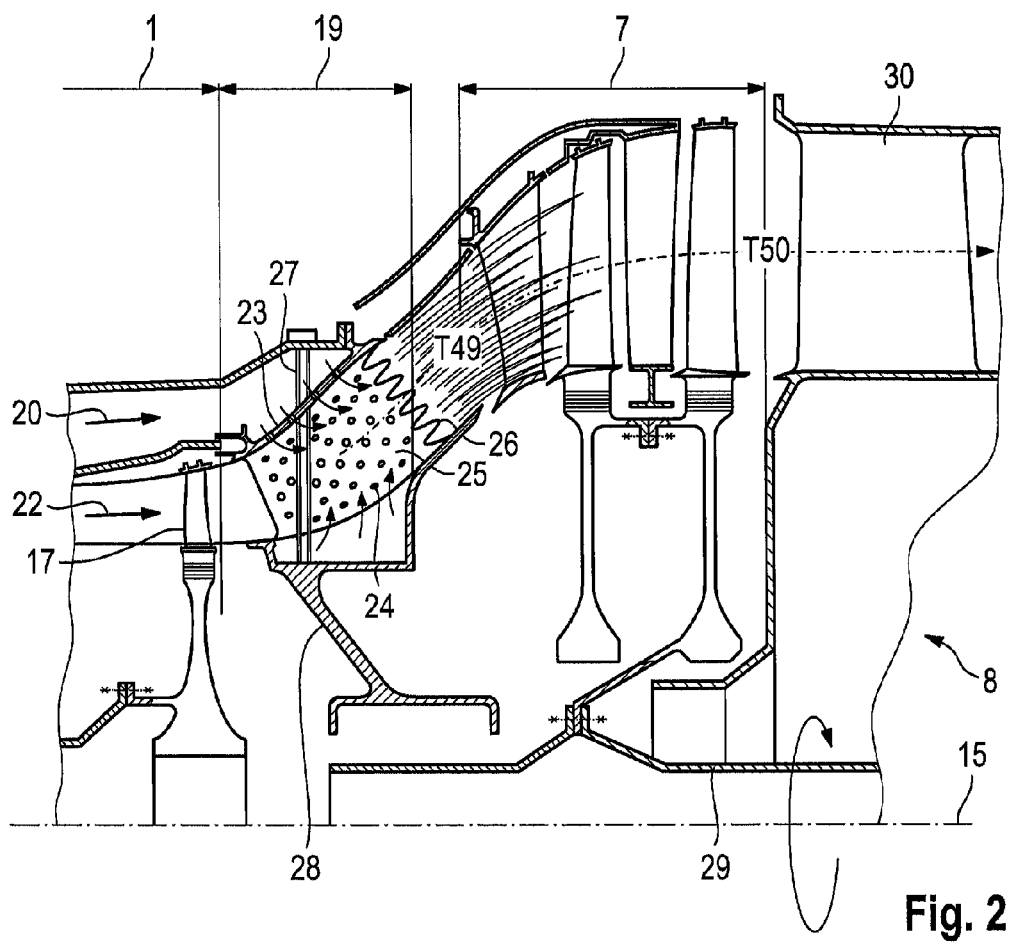
Figure 3:
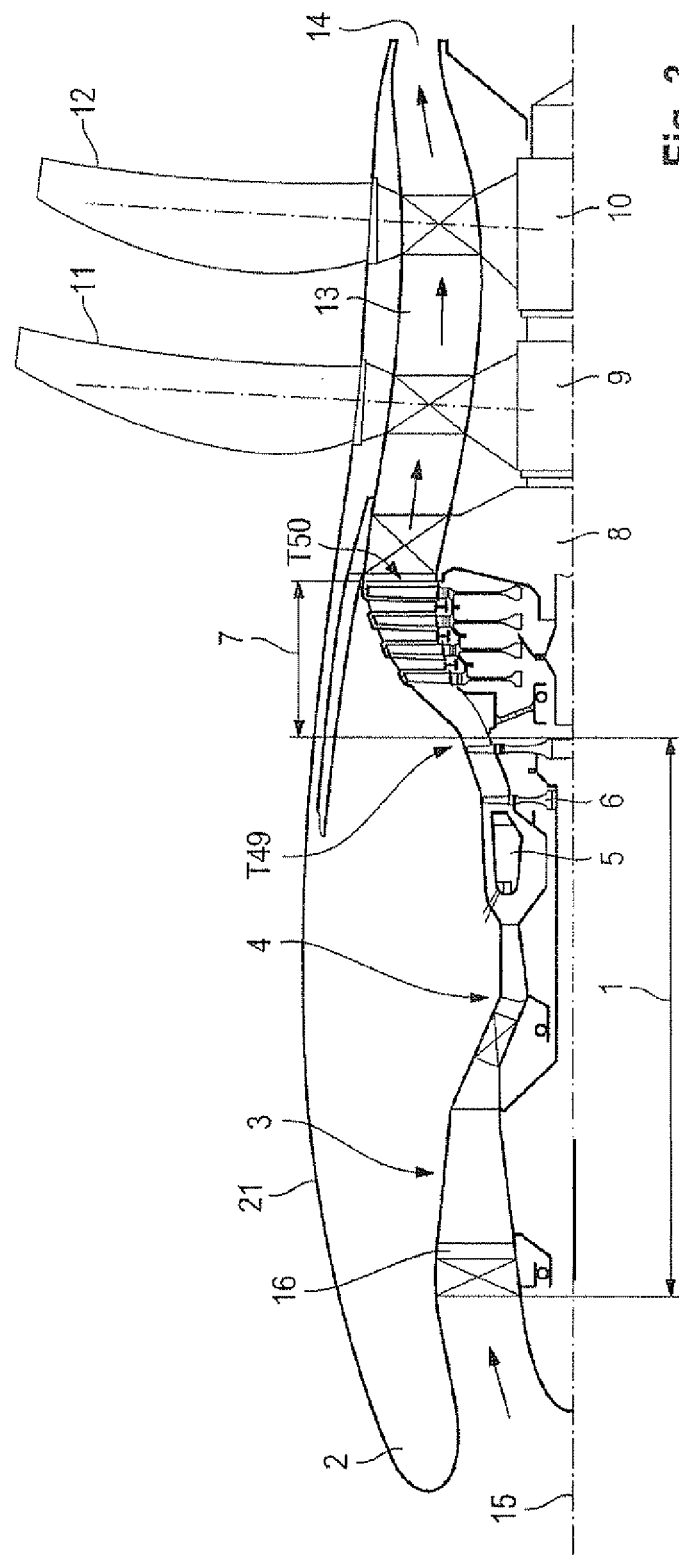

In the following, the invention is described based on an embodiment in connection with the drawing, in which FIG. 1 shows a schematic sectional view of the inventive aircraft gas turbine engine, FIG. 2 shows an enlarged detailed view of the mixer as well as of the low pressure turbine, and FIG. 3 shows a propeller turbo jet engine according to the state of the art.

The state of the art (FIG. 3) shows a double-shaft core engine 1 including an inlet 2 through which an airflow is supplied to a low pressure impeller 3 and subsequently to a high pressure impeller 4. Subsequently, a combustion chamber 5, a high pressure turbine 6 as well as a low pressure turbine 7 are arranged. Such an assembly is known from the state of the art, such that a detailed description thereof can be omitted.

A fan can be arranged in front of the low pressure impeller.

From the high pressure turbine, the gas flow, having a temperature level T49, flows into the low pressure turbine 7 and is output therefrom at a temperate level T50. This temperature level T50 is very high, such that it is required to cool a transmission 8 for driving a front hub 9 and a rear hub 10 of a front pressure propeller 11 and a rear pressure propeller 12 as well as the hubs 9 and 10 themselves.

FIG. 3 further shows that the flow is supplied to a nozzle 14 through a flow channel 13.

The rotating components rotate about an engine axis 15.

FIGS. 1 and 2 show an embodiment of the inventive aircraft gas turbine engine, wherein components identical to those of the embodiment of the state of the art according to FIG. 3 are designated with identical reference numerals.

Contrary to the state of the art, the low pressure impeller 3, the high pressure impeller 4, the combustion chamber 5, the high pressure turbine 6 as well as a medium pressure turbine 17 are surrounded by a bypass duct 18. A bypass flow 20 flows through said bypass duct (see FIG. 2), which bypass flow is supplied to a mixer 19. A primary flow 22 output from the medium pressure turbine 17 is also supplied to the mixer.

The mixer 19 comprises a housing 23 with recesses (perforations) 24 with which the cold bypass flow is mixed into the hot primary flow. In order to obtain a good mixture, mixer guide plates 25 as well as a flower-shaped trailing edge 26 are provided.

Structural components 27 protrude through the annular housing 23 of the mixer 19, which e.g. serve to support a low pressure turbine bearing assembly 28. Same e.g. supports a low pressure turbine shaft 29.

The flow output from the mixer 19 has a temperature level T49, which is considerably lower than a comparable prior art temperature level T49 at the exhaust region of the low pressure turbine 7. Accordingly, also the temperature level 150 (see FIG. 1) is lower than the comparable temperature level of the state of the art (FIG. 3).

FIGS. 2 and 3 further show the transmission 8 as well as the front hub 9 and the rear hub 10 of the front pressure propeller 11 and the rear pressure propeller 12, respectively.

According to the invention, the low pressure turbine 7 can be designed to have two stages, as is shown in FIG. 2.

Reference numeral 30 designates a low pressure turbine guide wheel.

According to the invention, the low pressure turbine is thus driven by the core flow 22 of the core engine as well as by the bypass flow 20 of the bypass duct 18. By means of the mixer 19, a considerable temperature reduction is obtained, which results in an advantageous temperature gradient. A further result is that the gases exhausted from the nozzle 14 are considerably colder, compared to the state of the art.

The invention is applicable for a propeller turbo jet engine including a single pressure propeller or two pressure propellers acting in opposite directions. The invention is applicable for embodiments of an engine in which the gas flow is passed through by rotating hubs of the pressure propeller(s) (see e.g. FIG. 1) as well as for embodiments in which the output flow is passed through outside the propeller(s).

The invention is further applicable for a compound jet engine having a variable bypass flow ratio, which can e.g. be used for engines of supersonic passenger aircrafts.

LIST OF REFERENCE NUMERALS 1 double-shaft core engine
2 inlet
3 low pressure impeller
4 high pressure impeller
5 combustion chamber
6 high pressure turbine
7 low pressure turbine
8 transmission
9 front hub
10 rear hub
11 front pressure propeller
12 rear pressure propeller
13 flow channel
14 nozzle
15 engine axis
16 fan/propeller
17 medium pressure turbine
18 bypass duct
19 mixer
20 bypass flow
21 engine pod
22 primary flow/core flow
23 housing
24 recess (perforation)
25 mixer guide plate
26 flower-shaped trailing edge
27 structural component
28 low pressure turbine bearing assembly
29 low pressure turbine shaft
30 low pressure turbine guide wheel
T49/T50 temperature level

The invention claimed is:

1. An aircraft gas turbine engine
a core engine comprising:
   a high pressure turbine and;
   a low pressure turbine downstream of the high pressure turbine;
   a core flow duct for passing a core flow from the high pressure turbine to the low pressure turbine;
a bypass duct surrounding the core engine;
a mixer arranged in an inlet portion of the low pressure turbine, into which a bypass flow from the bypass duct and a core flow from the core engine are supplied;
the mixer comprising a housing separating the core flow duct from the bypass duct, the housing having an interior and an exterior, the interior connected to the core flow for passing the core flow, the exterior exposed to the bypass flow in the bypass duct, the housing having a plurality of perforations running from the exterior to the interior for passing the bypass flow from the bypass duct into the interior for mixing with the core flow.

2. The aircraft gas turbine engine of claim 1, wherein, the housing include at least one flower-shaped trailing edge disposed at an end portion of the housing facing the low pressure turbine.

3. The aircraft gas turbine engine of claim 1, and further comprising at least one guide plate arranged in the housing.

4. The aircraft gas turbine engine of claim 1, and further comprising a nozzle arranged downstream of the low pressure turbine.

5. The aircraft gas turbine engine of claim 4, wherein the nozzle is formed convergently to generate thrust.

6. The aircraft gas turbine engine of claim 1, wherein the low pressure turbine is multi-stage.

7. Use of the aircraft gas turbine engine of claim 1 in a propeller jet engine having at least one chosen from two pressure propellers acting in opposite directions and a single pressure propeller.

* * * * *